(No Model.) 5 Sheets—Sheet 4.
G. W., J. R. & S. B. RUDE & H. G. SWOPE.
WALKING GRAIN DRILL.
No. 274,661. Patented Mar. 27, 1883.
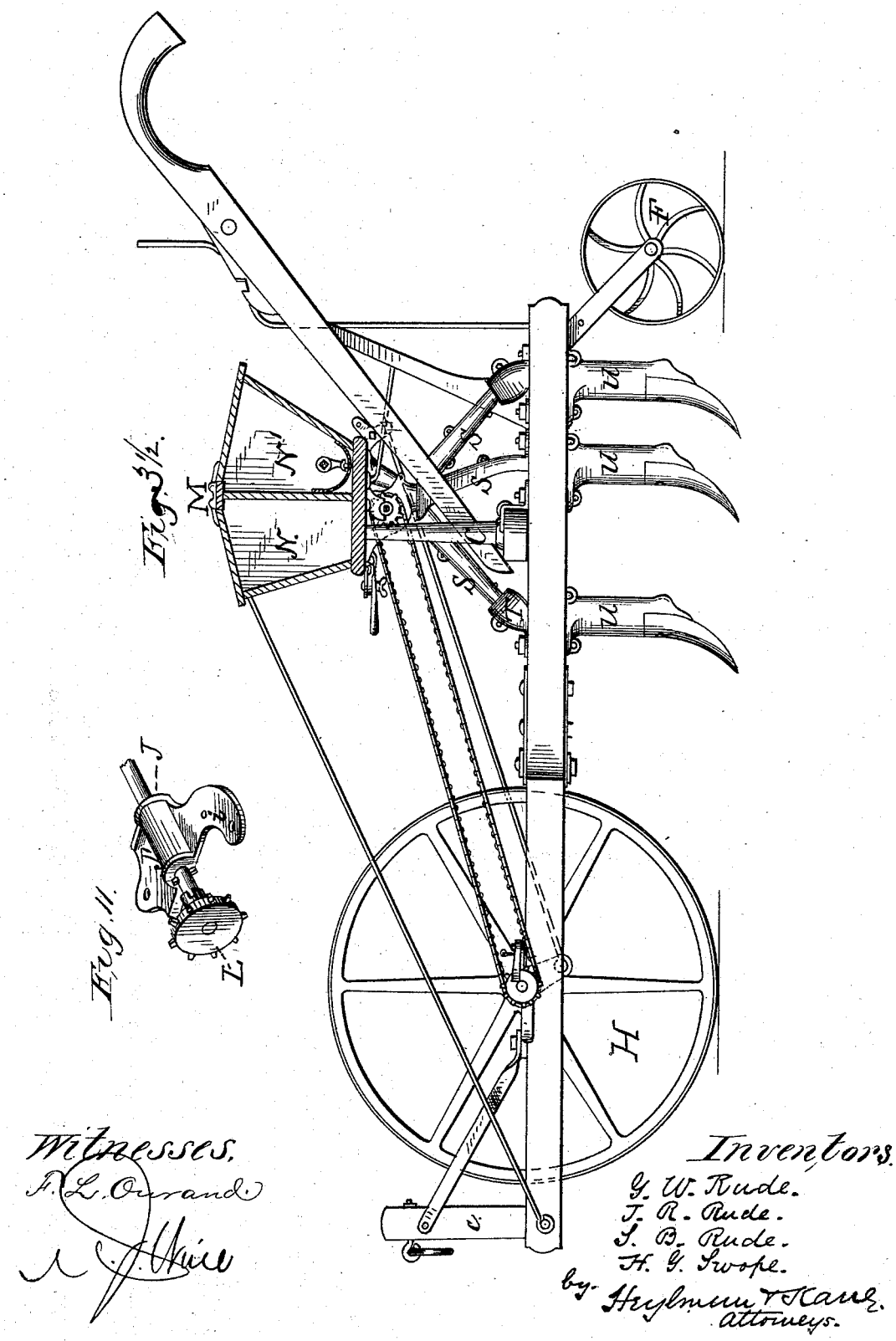

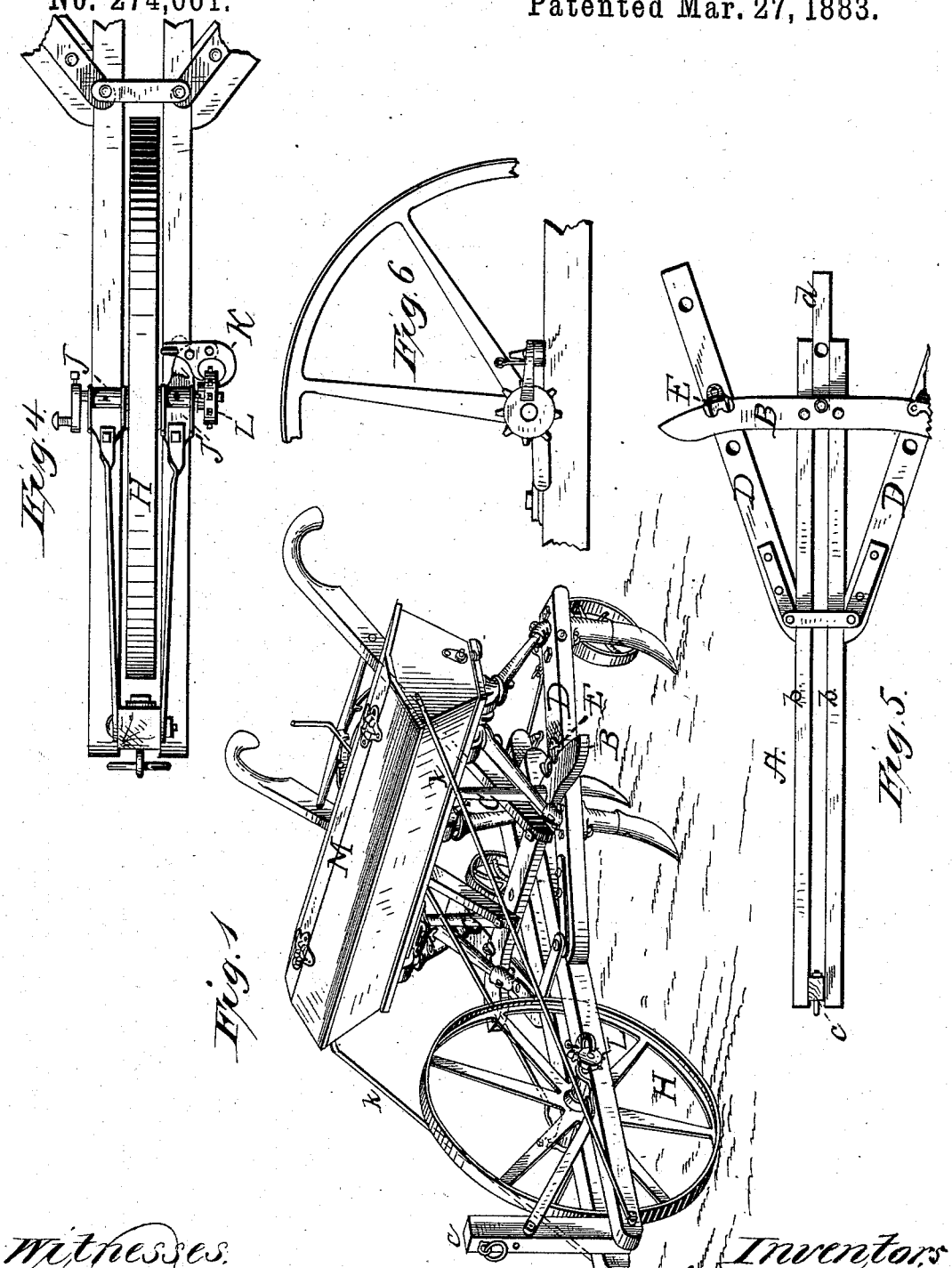

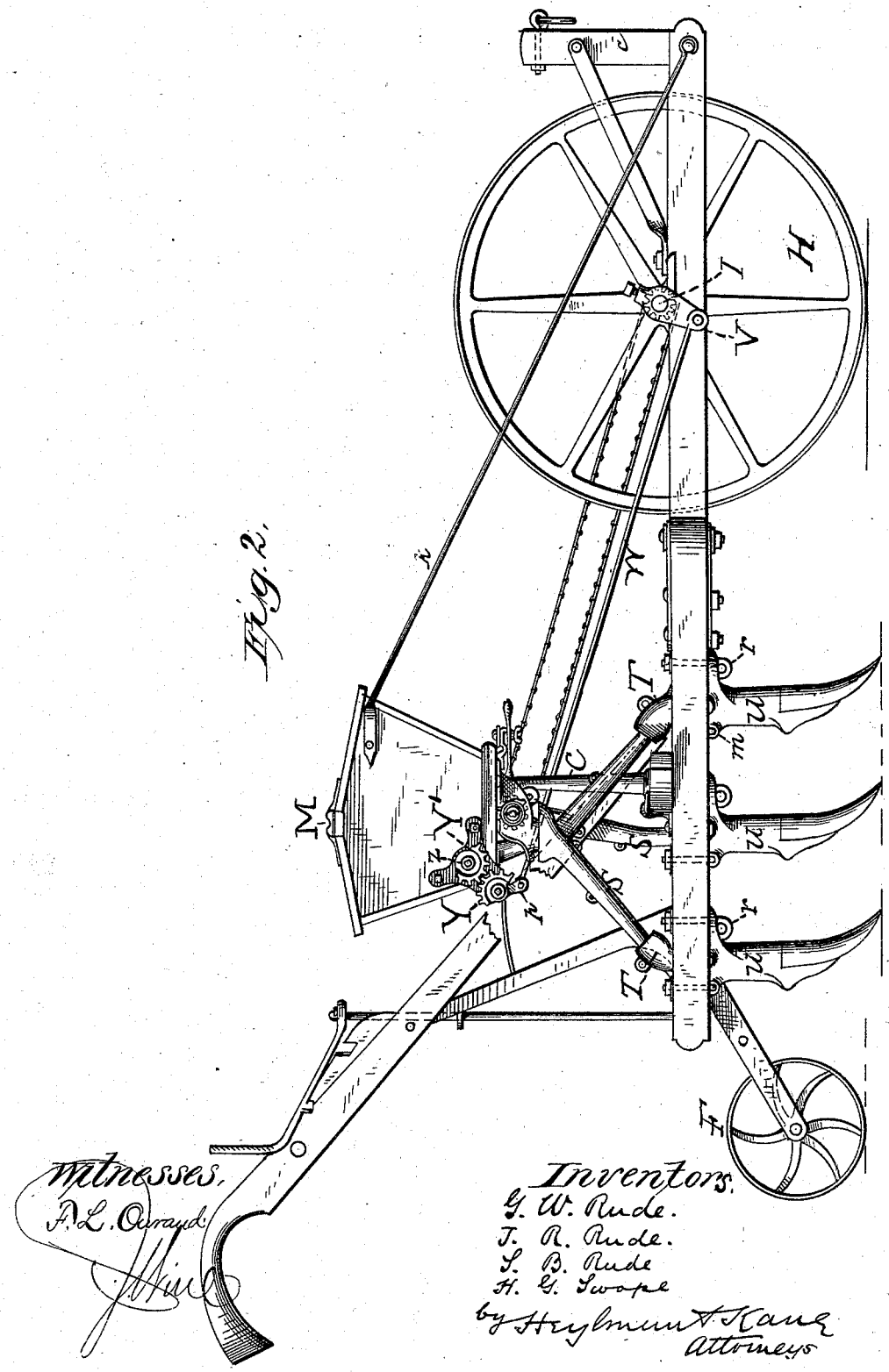

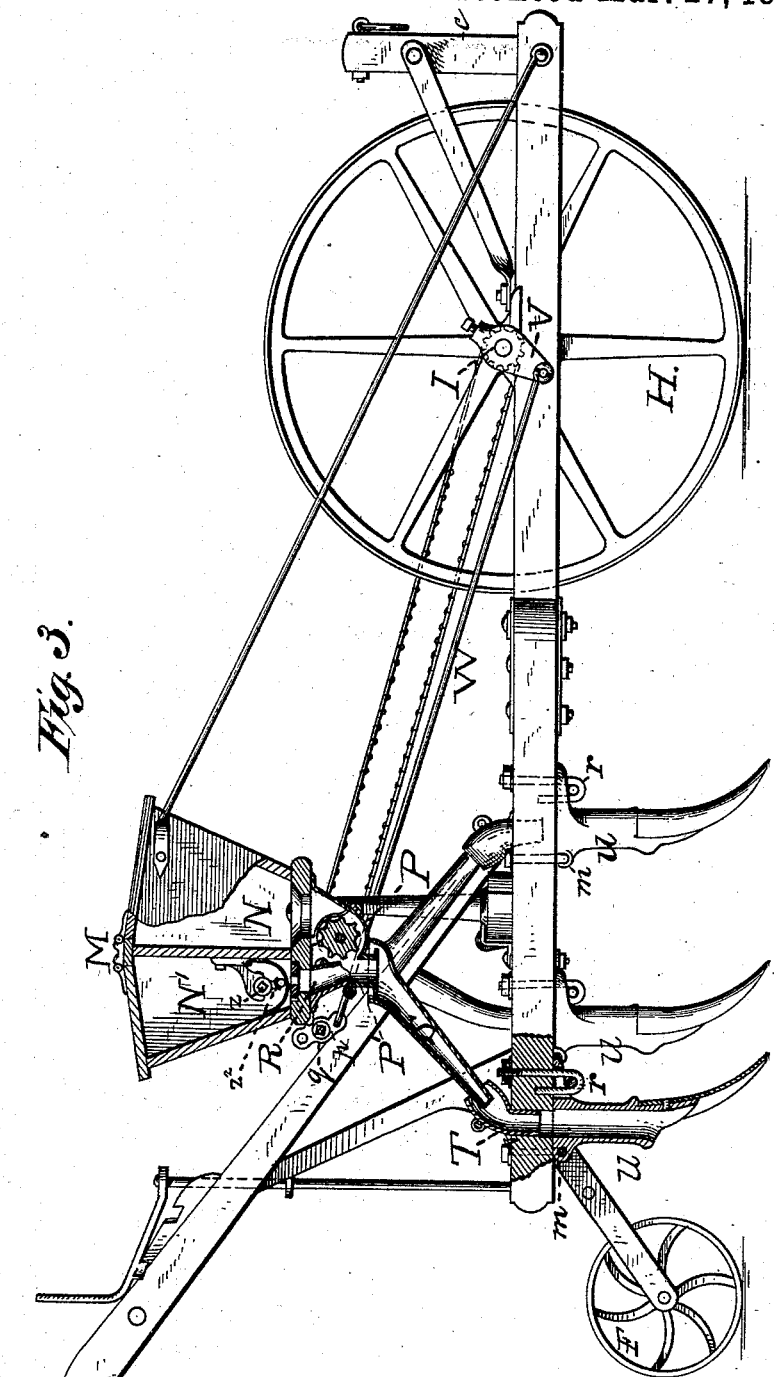

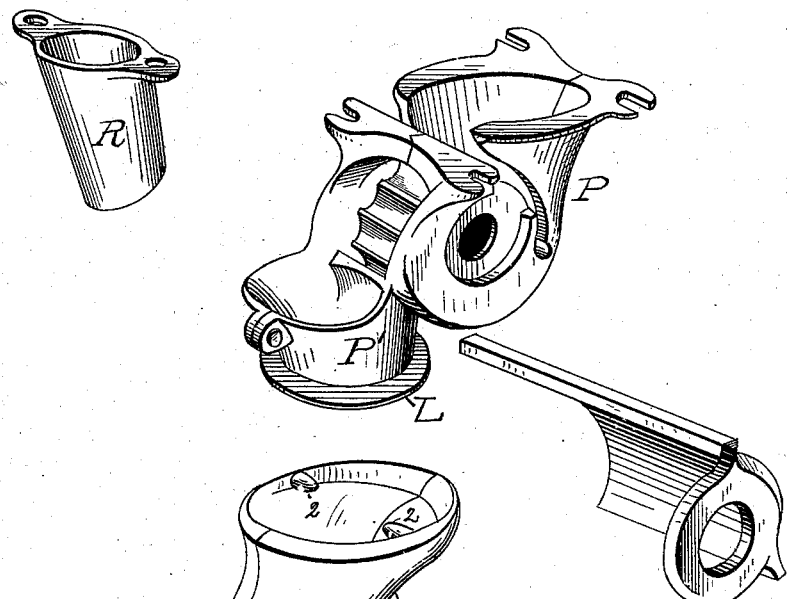
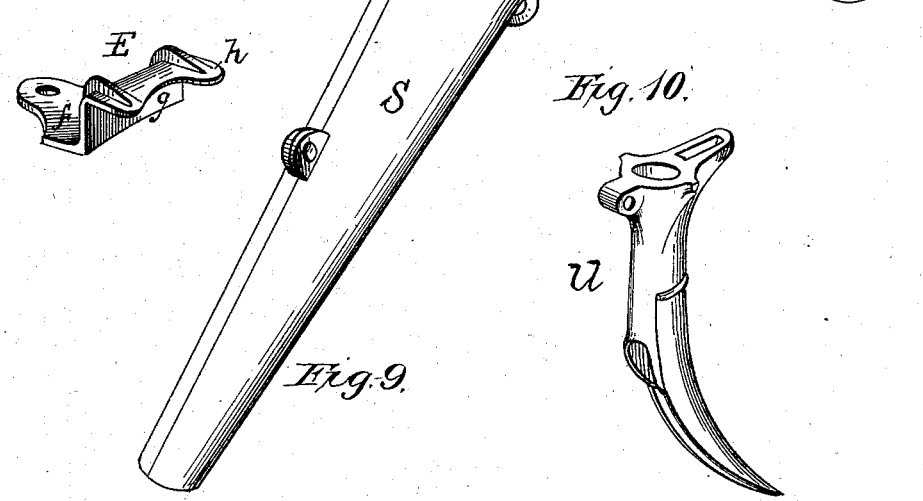

UNITED STATES PATENT OFFICE.

GEORGE W. RUDE, JOHN R. RUDE, SQUIRE B. RUDE, AND HORACE G. SWOPE, OF LIBERTY, INDIANA, ASSIGNORS TO RUDE BROTHERS MANUFACTURING COMPANY, OF SAME PLACE.

WALKING GRAIN-DRILL.

SPECIFICATION forming part of Letters Patent No. 274,661, dated March 27, 1883.

Application filed October 25, 1881. (No model.)

*To all whom it may concern:*

Be it known that we, G. W. RUDE, J. R. RUDE, S. B. RUDE, and HORACE G. SWOPE, citizens of the United States of America, residing at Liberty, in the county of Union and State of Indana, have invented certain new and useful Improvements in Walking Grain-Drills; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a perspective view of our improved machine. Fig. 2 is a side view of the same with a portion of one of the side handles broken away to show the mechanism for operating the fertilizer-distributer. Fig. 3 is a longitudinal sectional view of the hopper-boxes and the conductors. Fig. 3½ is a side view, with the hoppers in section, to show the means for operating the seed-wheel shaft. Fig. 4 is a plan view of the forward portion of the center beam, with means for shifting the sprocket-wheel on the drive-shaft. Fig. 5 is a plan view of the frame of the machine. Fig. 6 is an end view of the sprocket-wheel mounted on the drive-wheel shaft and the shifting device. Fig. 7 is a perspective view of the seed-cup with force-feed wheel, cut-off, and fertilizer-conductor. Fig. 8 is a perspective view of the clamping-plate. Fig. 9 is a perspective view of the adjustable conductor. Fig. 10 is a perspective view of the hoe; and Fig. 11 is a perspective view of the journal-bearing J', with the extension *i* and the sprocket-wheel mounted on the shaft working therein.

This invention relates to that class of seeding-machines known as the "walking grain-drills," and is designed more especially as an improvement on the one-horse machine patented to John R., Squire B., and Geo. W. Rude, dated October 5, 1869, and reissued December 13, 1881.

The objects of the present improvements are to provide this class of machines with a fertilizer attachment, so that the grain and fertilizer can be conveyed together to the drill or furrow in the ground, to dispense with the employment of a counter-shaft and its attachments, to simplify the construction of the parts, and to provide a better and more useful machine.

Prior to our improvements under consideration a two-horse machine mounted on wheels had been constructed with a seed-box, a fertilizer-box, and seed-cups, with feed-wheels arranged under the seed-box, over the discharge-openings and formed with a spout leading into a conductor arranged under the opening in the fertilizer-box; but this machine is different from ours in the organization, construction, and operation.

In our machine no side supporting-wheels are used, and only one horse is employed. The side beams are adjustable for working either narrow or wide drills. The fertilizer-conductor, to which the intermediate conducting-tube is connected, is an integral part of the seed-cup, and the mechanisms for operating the seed-feed and fertilizer feed devices are different.

In the annexed drawings, in which similar letters represent like parts, the letter A represents the center beam of the frame. This beam (see Fig. 5) is composed of two longitudinal parallel bars, *b b*, hitching-post *c*, and the rear intermediate bar, *d*, connected by means of bolts. The formed space between the hitching-post and the rear bar receives the driving-wheel. This construction of the center beam obviates the difficulty in constructing the beam of one piece, which requires it to be made of the best lumber, and also avoids the liability of splitting of the same. To the upper surface of these bars, near the rear end, is bolted the curved cross-bar B, to which the standards or uprights C are attached for supporting the hoppers or divided hopper.

To the sides of the parallel bars, about midway, are pivotally attached, by means of strap hinges or plates, the side beams or wings, D, arranged diagonally, and capable of being adjusted inward and outward to suit the condition of the rows. The upper surfaces of these side beams are provided with clamp-plates E, overhanging a portion of the curved cross-bar, and the office of the same is to retain and lift the side beams by the contact with the other portions of the implement in elevating the machine from the ground. The clamp-plate, made of cast-iron, is constructed with the base-flange $f$ for the passage of the fastening-bolt, vertical wall $g$, corresponding with the thickness of the cross-bar, and the overhanging flange $h$, substantially as seen in Fig. 8. Each of the side beams is provided with a guide-wheel, F, working in a frame suitably attached to the rear end of the said beams, and capable of presenting the wheel to the movement of the implement, and each of these side beams is also provided with two hoes, as will be hereinafter described.

The letter H represents the driving-wheel, sometimes called "pilot-wheel," mounted on the transverse driving-shaft I, working in the journal-bearings J, secured to the upper surfaces of the longitudinal parallel bars, near their front ends. One of these journal-bearings, J', is formed with a rear extension or side lug, $i$, to which is pivoted a shifting device, K, for engaging and disengaging the sprocket-wheel L with the clutch-face of the driving-shaft I, substantially as seen in Figs. 1 and 4 of the drawings. The shifting device is constructed with a recess and two fingers, so as to straddle the sprocket-wheel and move the same on the shaft, and also provided with a thumb-piece and a locking-pin, as seen in Fig. 4.

The letter M represents the hopper, supported upon the standards C and braced by the side rods, $k$, extending to the front end of the center beam, substantially as shown. This hopper is divided, by means of a vertical partition extending from bottom to top, into two compartments, N N', the forward one for the seed and the rear compartment for the fertilizer, thus forming a double hopper. The bottom of each of these compartments is provided with a plurality of openings—in this case five—said openings in the fertilizer-compartment being opposite those in the seed-compartment, so as to feed and mix the materials of the respective compartments in a conductor or tube common to both discharge-openings.

To the under side and immediately over the seed-openings of the hopper are suitably fastened the seed-cups P, with rearward tubular extensions, P', beyond the discharge-orifice of the feed-wheel chamber, to receive the lower ends of the short conductors R, secured to the under side of and over the openings in the bottom of the fertilizer-chamber, substantially as shown. Within the seed-cups are arranged force-feed seed-wheels and cut-offs mounted on the rectangular shaft. The seed-cups, which are made of cast-iron, are made in halves, and afterward united by rivets, substantially as shown in Fig. 7.

The letter S represents the conductors, the upper ends thereof connected to the flange at the bottom of the tubular extensions P', and suspended therefrom by means of lugs 2, extending inward from opposite sides, and resting upon the flange, and the lower ends fitting within the receivers T, secured to the beams. These conductors, one of which is shown in perspective in Fig. 9, are made of cast-iron in halves, and afterward united by rivets. By this construction of the seed-cups with the bottom flange, $l$, and the conductors with the lugs fitting over the flanges L of the seed-cups, and loosely within the receivers T, the conductors will conform to the adjustment of the side beams.

The letter U represents the hoes connected to the under side of the beams immediately under the grain-receivers T, and the vertical openings through the beams by means of the hinge-staples $m$, passed through the eyes at the upper rear end of the hoes, and made fast at the front ends by means of the wooden brake-pins passed through the loops $r$, substantially as shown.

The bars, it will be observed, are constructed with the rear lug perforated to receive the pivotal connection, and the slotted front extensions to pass over the hooks that receive the wooden brake-pins, and that the hinges and brake-pins are in the line of the draft of the machine.

The letter V represents a crank attached to the driving-shaft I by means of a set-screw, or otherwise, and to this crank is attached a pitman, W, sustained in position by means of a split key making connection with the crank $p$, mounted on a square counter-shaft, Q, arranged and supported in suitable brackets in rear of the shaft operating the feed seed-wheels.

To one end of the counter-shaft (see Fig. 2) is secured a sector-gear, Y, engaging with a similar sector-gear, Y', secured to the end of the shaft Z, passing through the fertilizer-chamber, that operates the connected stirrers $Z^2$, working over the discharge-openings in the bottom of the chamber.

The machine is provided with the usual adjusting-gages for regulating the feed of seed and fertilizers.

A machine thus constructed makes a light implement that can be worked by a single horse and man or boy, and is well suited to farmers of limited means.

Operation: A horse is attached to the hitching-post of the implement, and the driver at the rear grasps the handles, and as the implement is drawn forward by the horse the hoes enter the ground or soil, and the wheel is caused to revolve by coming in contact with the surface, which imparts motion to the sprocket-wheel and crank, and to the sprocket-wheel mounted on the feed-shaft operating the feed seed-wheels and the stirrers through the agency of the sprocket-chain and the pitman, respectively. The seed as dropped into the seed-cups is forced therefrom by means of the feed-wheels working therein, and discharges the same into the tubular extension, where it is met by the fertilizer falling through the short conductors. Thence the materials fall by gravity into the conductors, from whence they are directed by the receivers into the hoes, and finally to the ground, mixed. The oscillating motion to the stirrer within the fertilizer-box assists in breaking the lumps of the material and feeding the same uniformly through the discharge-openings. The conductor attached to the center beam is stationary.

What we claim as our invention, and desire to secure by Letters Patent, is—

1. The organized one-horse walking grain-drill composed of the following combination, to wit: a frame with the side adjustable beams and their hoes, a double hopper mounted upon the frame and provided with means for feeding the grain and fertilizer, conducting-tubes loosely connected with the feed-discharge and the center and side beams of the frame for conveying the grain and fertilizer together to the hoes, a single driving-wheel with connected mechanism for operating the seed and fertilizer means, and mechanism for adjusting the side beams of the frame, whereby drills of different widths may be made and the grain and fertilizer deposited together in the drills, substantially as described.

2. In a one-horse walking grain-drill, the combination, with the fertilizer-hopper and its agitator, of the driving-wheel shaft provided with a crank, the connecting-rod W, counter-shaft $q$, with crank $p$, and the sector-gears Y Y', as described.

3. In a walking grain-drill, the combination, with the shaft of the driving-wheel and its journal-bearings, one of which is formed with an extension, $i$, of a sprocket-wheel with a clutch-face adapted to engage with the clutch of the driving-shaft and the shifting device, substantially as described.

4. In an organized walking grain-drill, the combination, with the center beam and the curved cross-bars, of the hinged adjustable side beams provided with the clamp-plates overhanging the curved cross-bar, substantially as and for the purpose set forth.

In testimony whereof we affix our signatures in presence of two witnesses.

GEORGE W. RUDE.
JOHN R. RUDE.
SQUIRE B. RUDE.
HORACE G. SWOPE.

Witnesses:
D. H. BOYER,
A. E. JOHNSON.